US006432587B1

(12) United States Patent
Lee et al.

(10) Patent No.: US 6,432,587 B1
(45) Date of Patent: Aug. 13, 2002

(54) ELECTROLYTE FOR A LITHIUM SECONDARY BATTERY

(75) Inventors: Jin-Uk Lee, Asan; Joon-Hwan Lee, Cheonan, both of (KR)

(73) Assignee: Samsung SDI Co., Ltd., Suwon-si (KR)

( * ) Notice: Subject to any disclaimer, the term of this patent is extended or adjusted under 35 U.S.C. 154(b) by 85 days.

(21) Appl. No.: 09/629,990

(22) Filed: Aug. 1, 2000

(30) Foreign Application Priority Data

Aug. 3, 1999 (KR) .............................................. 99-31862

(51) Int. Cl.$^7$ ................................................. H01M 6/16
(52) U.S. Cl. ........................ 429/324; 429/207; 252/62.2
(58) Field of Search ................................ 429/324, 326, 429/188, 330, 331, 332, 339, 340, 207, 231.95, 231.8, 231.1, 231.4; 252/62.2, 500, 182.1

(56) References Cited

U.S. PATENT DOCUMENTS

| 5,569,558 A | * | 10/1996 | Takeuchi et al. ............. 429/122 |
| 5,686,203 A | * | 11/1997 | Idota et al. .................. 429/194 |
| 6,274,269 B1 | * | 8/2001 | Gan et al. .................... 429/215 |

* cited by examiner

Primary Examiner—Stephen Kalafut
Assistant Examiner—R. Alejandro
(74) Attorney, Agent, or Firm—Christie, Parker & Hale, LLP

(57) ABSTRACT

An electrolyte for a lithium secondary battery is prepared by injecting a gas additive having a higher reduction potential than a non-aqueous organic solvent into the non-aqueous organic solvent. The gas additive has a reduction potential ranging from 0.5 to 3.5 V based on the Li$^+$ ions. Examples of gas additives include $SO_2$, $CO_2$, and $N_2O$. In a secondary battery using the electrolyte to which the gas additive is not added, the non-aqueous organic solvent itself reacts with lithium ions at the beginning of the battery charging to form a solid electrolyte interface film and produces gases inside the battery, thereby increasing the internal pressure of the battery. However, in the electrolyte containing the gas additive of the present invention, the gas additive reacts with the lithium ions dissolved in the electrolyte to form a solid electrolyte interface film without producing gases that would increase the internal pressure of the battery. An electrolyte containing a gas additive prevents the production of gases, which increases the internal pressure of the battery and thus prevents the modification of the appearance of the battery. In addition, a lithium secondary battery prepared in accordance with the present invention has excellent discharge properties, cycle life and stability.

13 Claims, 8 Drawing Sheets

ELECTROLYTE FOR A LITHIUM SECONDARY BATTERY

FIELD OF THE INVENTION

The present invention relates to an electrolyte containing a gas additive having a high reduction potential and a lithium secondary battery comprising the same. More particularly, the present invention relates to an electrolyte containing a gas additive having a high reduction potential which does not increase the internal pressure of the battery, since it does not generate gases when reacting with lithium ions present in the electrolyte to produce a solid electrolyte interface film, and a lithium secondary battery comprising the same.

BACKGROUND OF THE INVENTION

Recently, developments in the newest electronics industry have enabled electronic equipment to become smaller and more light-weight, and this has increased the use of portable electronic equipment. For the electricity source of such portable electronic equipment, a battery having a high energy density is required. Thus, lithium secondary batteries have been actively studied. A lithium-transition metal oxide is used as the positive active material, and lithium, a lithium alloy, carbon or a carbon complex is used as the negative active material. A secondary battery is prepared by coating the active material on an electric precipitator in an appropriate thickness and length, or coating the active material itself in the form of a film and winding or laminating it with an insulator separator to make an electrode group, putting it in a container, and then injecting the electrolyte therein.

At the beginning of discharge, lithium ions in an electrolyte of a lithium secondary battery react with a non-aqueous organic solvent and thus a lithium secondary battery produces a solid electrolyte interface film while generating gases. Such gases may be $H_2$, $CO_2$, $CH_4$, $C_2H_6$, $C_3H_8$, $C_3H_6$, etc. depending on the kind of non-aqueous organic solvent in the battery. These gases that are generated at the beginning of battery discharge increase the internal pressure of the battery by approximately 1.5 to 2.5 kgf/cm² or more. The increase in internal pressure induces modification of the center of a specific side of the battery such as swelling in a specific direction. This causes a local difference in adhesion characteristics between electrode plates in electrode groups of the battery. Thus the characteristics and stability of the battery decrease.

In order to solve the aforementioned problem, a container ranging from 0.40 to 0.60 mm in thickness is used in a rectangular-shaped battery, but this decreases the energy density and increases the weight of the battery. In addition, in order to improve the stability of a secondary battery comprising an electrolyte, a vent or current breaker which emanates internal electrolyte as the internal pressure increases above a certain degree, is constructed therein. However, this causes a risk of misoperation due to the increase in internal pressure.

SUMMARY OF THE INVENTION

It is an object of the present invention to provide an electrolyte for a lithium secondary battery containing a gas additive that has higher reduction potential than the organic solvent, and that does not produce gases when reacting with lithium ions to form a solid electrolyte interface film.

It is another object of the present invention to provide a lithium secondary battery that has excellent battery properties such as cycle life, high rate discharge properties, low temperature discharge properties, excellent stability, etc. and that is not modified in appearance when discharged, In order to achieve said objects, the present invention applies an electrolyte comprising a non-aqueous organic solvent to which is added a gas additive having a high reduction potential compared to the non-aqueous organic solvent, to a lithium secondary battery.

DETAILED DESCRIPTION OF THE INVENTION

Figure 1:
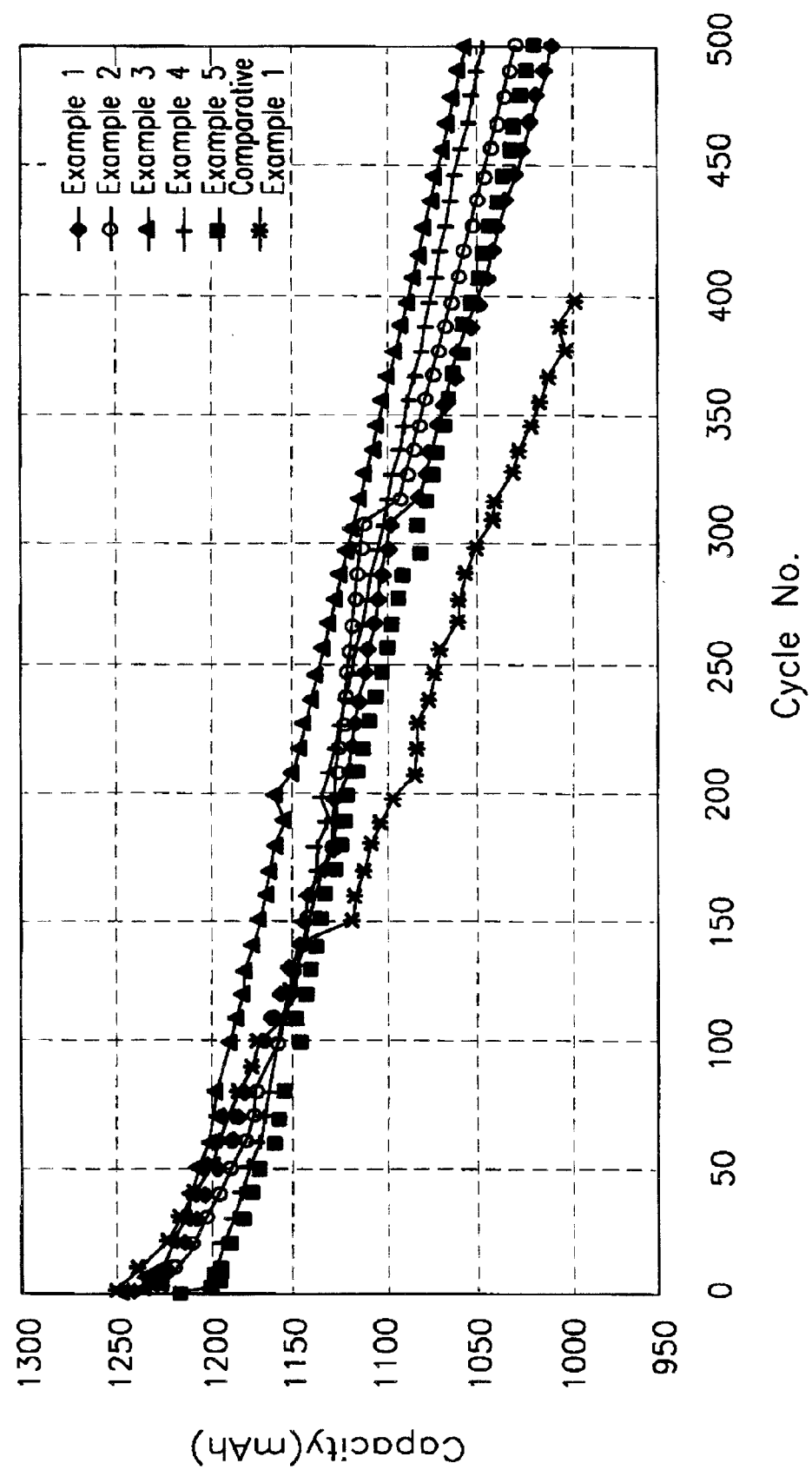
FIG. 1 is a graph showing the cycle life of lithium secondary batteries in which the electrolytes of Examples 1 to 5 and Comparative Example 1 are injected.
Figure 2A:
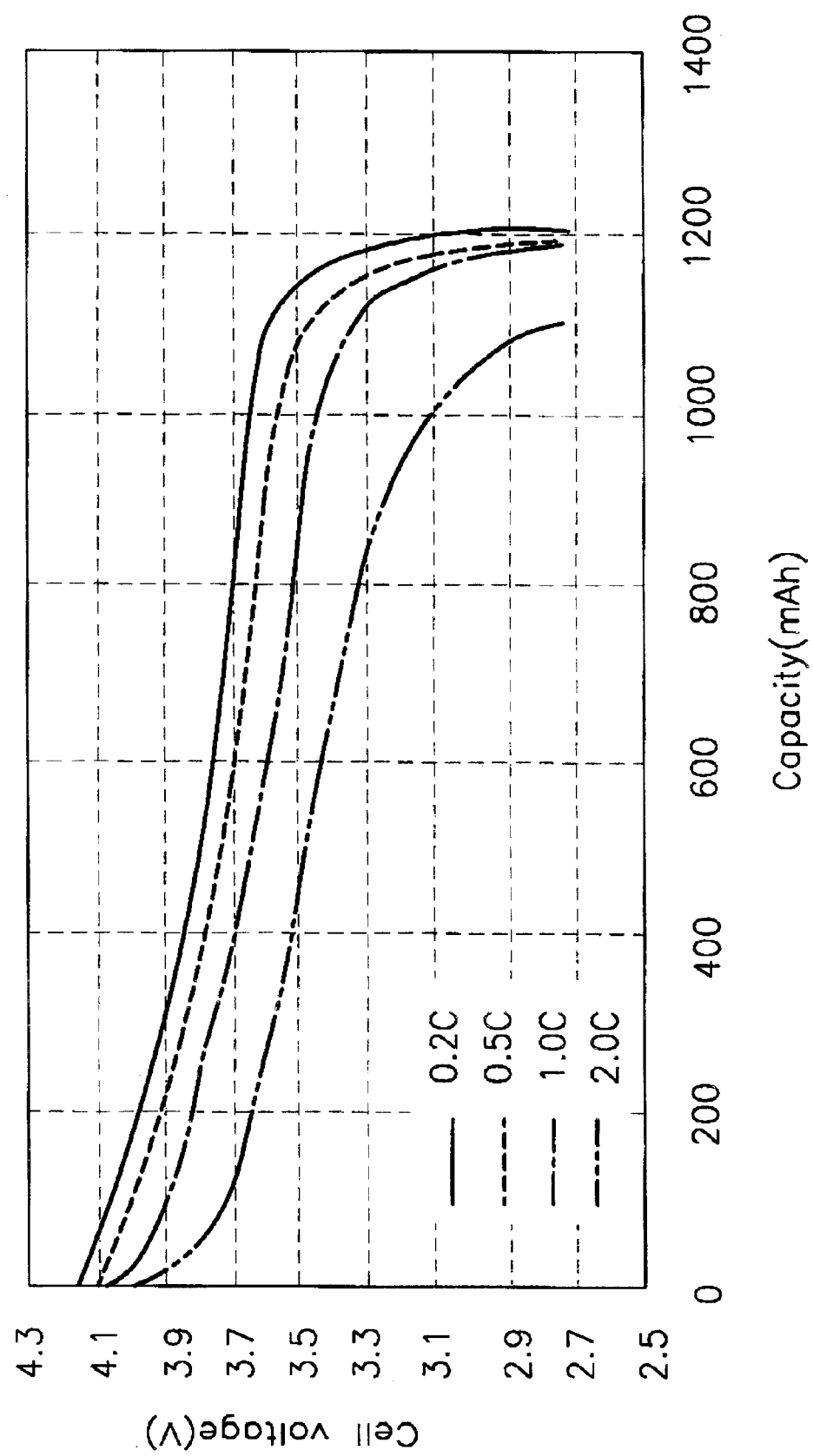
FIGS. 2a to 2f are graphs showing the high rate discharge characteristics of lithium secondary batteries in which the electrolytes of Examples 1 to 5 and Comparative Example 1 are injected.
Figure 2B:
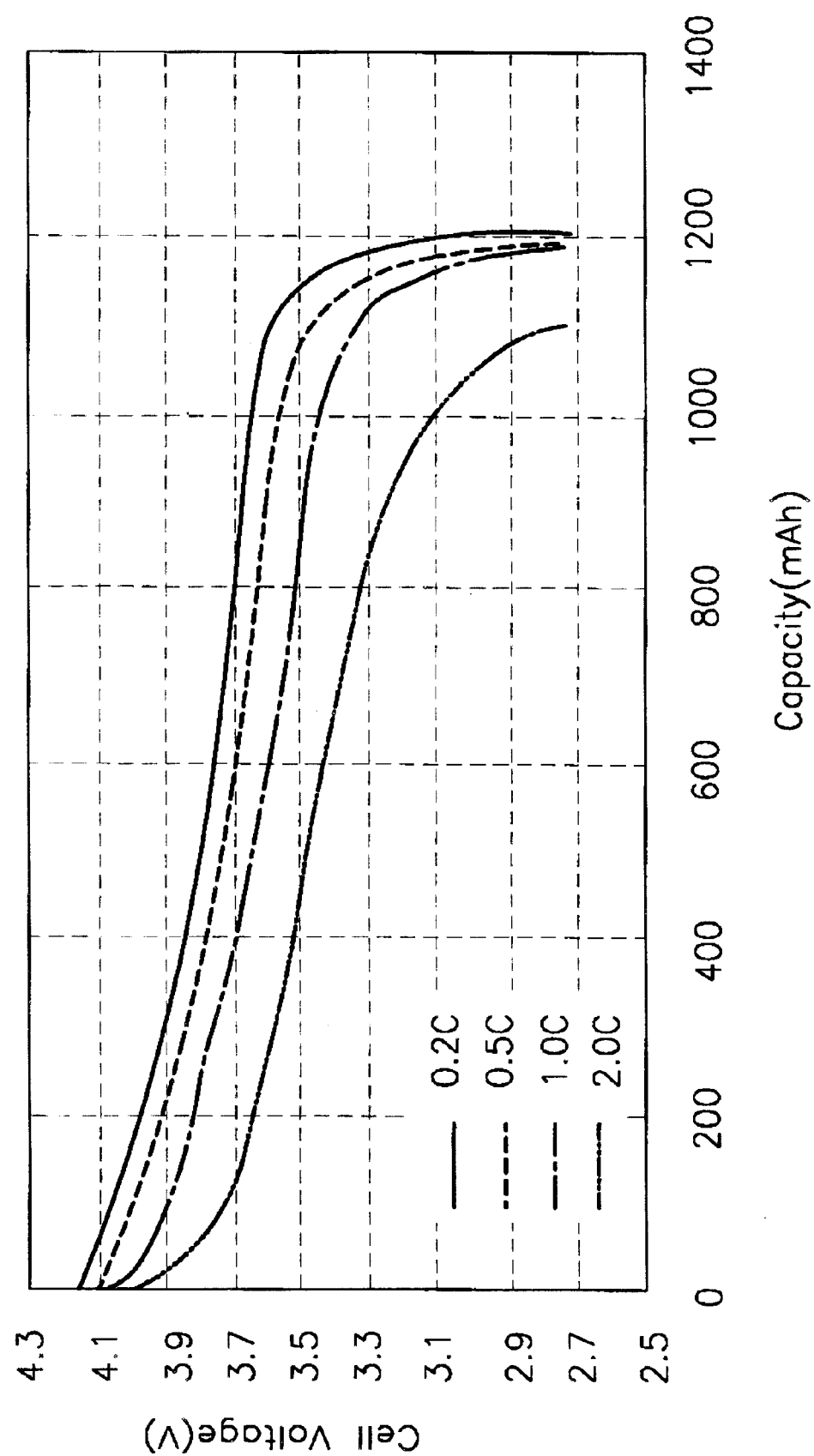
Figure 2C:
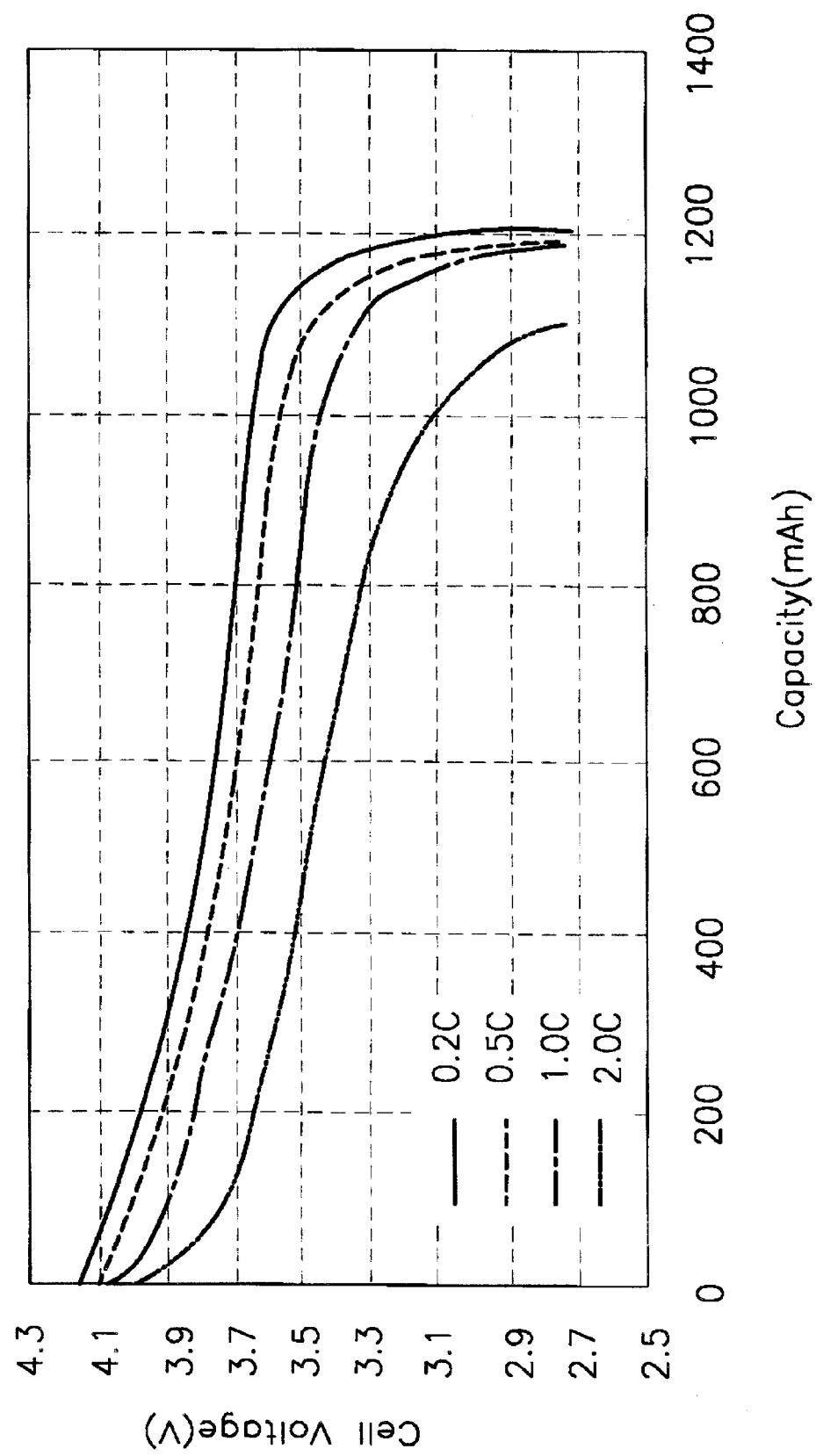
Figure 2D:
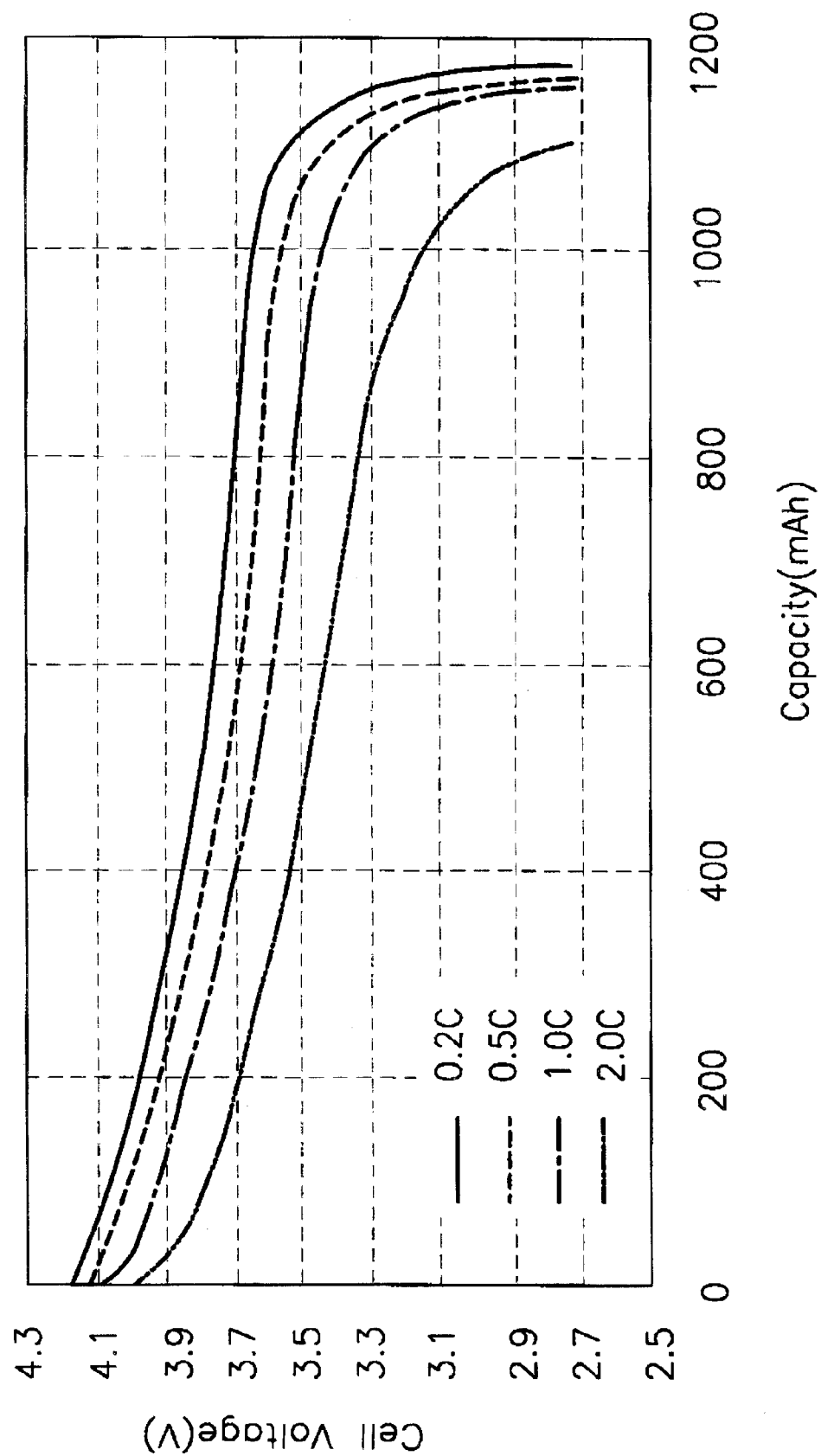
Figure 2E:
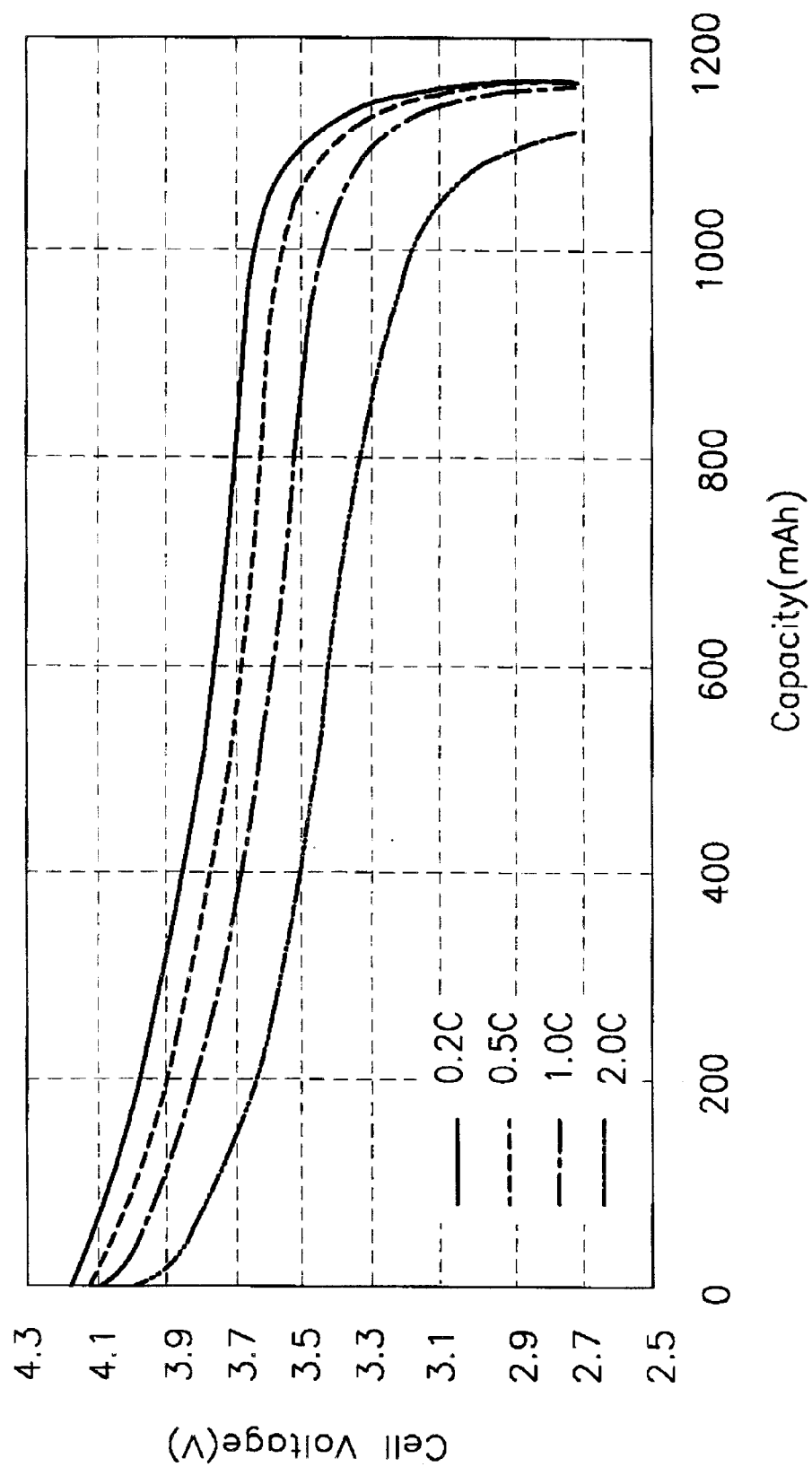
Figure 2F:
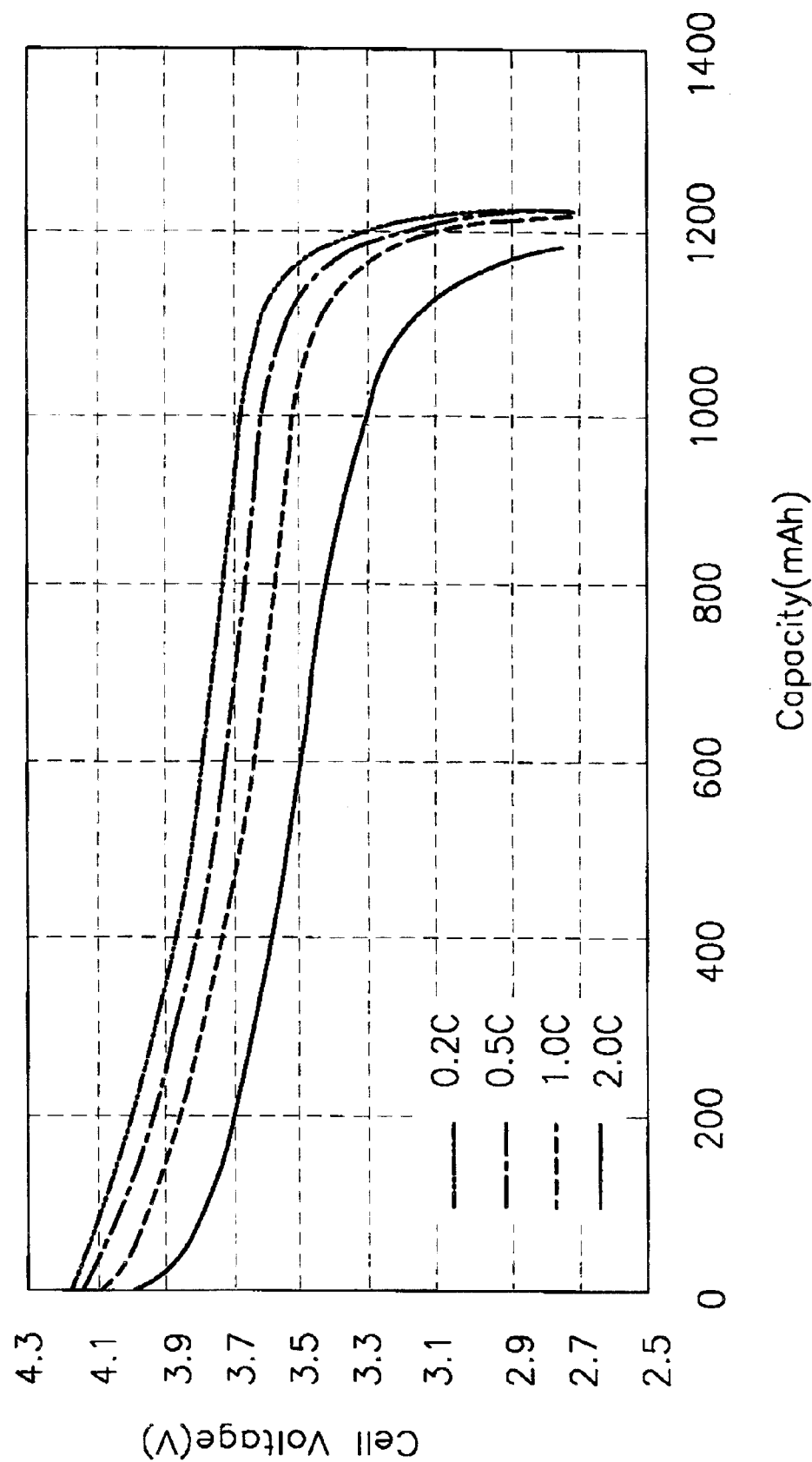

The electrolyte of the present invention is prepared by adding a gas additive having a higher reduction potential than a non-aqueous organic solvent to the solvent. The gas additive has a reduction potential ranging from 0.5 to 3.5 V based on the Li⁺ ions. If the reduction potential is less than 0.5 V, the reduction potential of the organic solvent will be lowered. In addition, if the reduction potential exceeds 3.5 V, the degree of reaction will become uncontrollable since reactions will suddenly occur when currents first flow to the electrode. If the degree of reaction becomes uncontrollable, the homogeneity of the solid electrolyte interface (SEI) film produced by the reaction of the lithium ions and the gas additive will be lowered.

Examples of gas additives include $SO_2$, $CO_2$, $N_2O$, etc. They are contained in the non-aqueous organic solvent in an amount of 20% by weight or less based on the weight of the organic solvent. If the gas additive exceeds 20% by weight, the gases will be excessively dissolved in the electrolyte, and thus, when standing the electrolyte at high temperatures of 60 to 85° C., the gases will greatly increase the inner pressure of the battery. The injection of the gas additive may be carried out by various methods such as forming bubbles using a cylinder, etc., and then letting it stand for a definite time. Since the gas additive has a higher reduction potential and reaction rate than the non-aqueous organic solvent, the non-aqueous organic solvent reacts with lithium ions in the electrolyte to produce an SEI film. In a conventional secondary battery using an electrolyte to which a gas additive is not added, the non-aqueous solvent itself reacts with lithium ions to produce an SEI film and generate gases inside the battery, thereby increasing the inner pressure. However, according to the present invention, the gas additive added to the non-aqueous organic solvent reacts with lithium ions to produce an SEI film without generating gases that increase the inner pressure of the battery.

As a non-aqueous organic solvent, cyclic or chain carbonates or a mixture of two or more carbonates can be used. Examples include ethylene carbonate (EC), dimethyl carbonate (DMC), diethyl carbonate (DEC), methylethyl carbonate (MEC) and propylene carbonate (PC).

The electrolyte of the present invention may comprise lithium hexafluorophosphate, lithium tetrafluoroborate, lithium perchlorate, lithium trifluoromethanesulfonate, lithium hexafluoroarsenate, or mixtures thereof as a supporting electrolytic salt. These electrolytic salts are added in a concentration ranging from 0.8 to 1.5 M.

The present invention uses a lithium-transition metal oxide as a positive active material of the lithium secondary battery and lithium metal, a lithium alloy, carbon or a carbon complex as a negative active material. The lithium secondary battery is prepared by coating the active material on an electric precipitator in an appropriate thickness and length, or coating the active material itself in the form of a film and winding or laminating it with an insulator separator to make an electrode group, putting it in a container, and then injecting a non-aqueous electrolyte to which the gas additive is added therein.

Polyethylene, polypropylene film, and the like can be used as the separator. The electrolyte of the present invention can be applied to all types of lithium secondary batteries including lithium ion batteries, lithium polymer batteries, and the like.

The present invention will be explained in more detail with reference to the following examples. However, the following examples are for illustration of the present invention, and the present invention is not limited to them.

Example 1

To a non-aqueous organic solvent in which ethylene carbonate, dimethyl carbonate, methylethyl carbonate, and propylene carbonate were mixed in a ratio of EC/DMC/MEC/PC of 41/24/25/10, $CO_2$ was added as gas additive in the form of bubbles for 2 minutes at a constant velocity of 1 L/min so that the solvent contained 0.2% by weight of $CO_2$. Then, 1.15 M $LiPF_6$, the electrolytic salt, was added thereto to prepare the electrolyte of Example 1.

Example 2

The electrolyte was prepared in the same manner as described in Example 1, except that $CO_2$ was added for 10 minutes so that the solvent contained 0.3% by weight of $CO_2$.

Example 3

To a non-aqueous organic solvent in which ethylene carbonate, dimethyl carbonate, methylethyl carbonate, and propylene carbonate were mixed in a ratio of EC/DMC/MEC/PC of 41/24/25/10, $SO_2$ was added as a gas additive in the form of bubbles for 2 minutes at a constant velocity of 1 L/min so that the solvent contained 0.2% by weight of $SO_2$. Then, 1.15 M $LiPF_6$, the electrolytic salt, was added thereto to prepare the electrolyte of Example 3.

Example 4

The electrolyte was prepared in the same manner as described in Example 3, except that $SO_2$ was added for 5 minutes so that the solvent contained 5.0% by weight of $SO_2$.

Example 5

The electrolyte was prepared in the same manner as described in Example 3, except that $SO_2$ was added for 10 minutes so that the solvent contained 7.5% by weight of $SO_2$.

Comparative Example 1

To a non-aqueous organic solvent, in which ethylene carbonate, dimethyl carbonate, methylethyl carbonate, and propylene carbonate were mixed in a ratio of EC/DMC/MEC/PC of 41/24/25/10, 1.15 M $LiPF_6$, an electrolytic salt, was added to prepare an electrolyte.

Preparation of Lithium Secondary Batteries

A cathode slurry was prepared by mixing $LiCoO_2$ as a positive active material, Super-P (MMM Carbon Company) as a conductor and polyvinylidene fluoride (PVDF) as a binder. An anode slurry was prepared by mixing MCF (Petoca Company) as a negative active material and PVDF as a binder. Electrodes were prepared by coating the cathode slurry on aluminum foil, and coating the cathode slurry on copper foil. The cathode was compacted to a thickness of 1665 $\mu$m and cut to a size of 387×54 mm$^2$. The anode was compacted to a thickness of 191 $\mu$m and cut to a size of 407×56 mm$^2$. The electrodes were put in a container having a thickness of 6 mm, a width of 34 mm and a height of 63.5 mm, and then the electrolytes of Examples 1 to 5 and Comparative Example 1 were injected therein to prepare the batteries.

Measurement of Change of Thickness of the Batteries

Lithium secondary batteries to which the electrolytes of Examples 1 to 5 and Comparative Example 1 were applied were charged at 240 mA to 4.2 V using a discharger/charger. The thicknesses of the batteries were measured and are presented in Table 1. The thicknesses of the batteries before charging were 5.90±0.2 mm.

TABLE 1

|  | Examples | | | | | Comparative Example |
|---|---|---|---|---|---|---|
|  | 1 | 2 | 3 | 4 | 5 | 1 |
| Thickness of battery after charging (mm) | 6.38 | 6.36 | 6.18 | 6.08 | 6.09 | 6.42 |

As shown in Table 1, batteries to which the $CO_2$-containing electrolytes of Examples 1 and 2 and $SO_2$-containing electrolytes of Examples 3 to 5 were applied showed less increase in thickness than the battery using the electrolyte of Comparative Example 1. The reason that the secondary batteries using $SO_2$-containing electrolytes showed less increase in thickness than those using $CO_2$-containing electrolytes is judged to be that more $SO_2$ was dissolved in the electrolytes since $SO_2$ is more soluble than $CO_2$.

Cycle Lives of the Batteries

The cycle lives of the lithium secondary batteries to which the electrolytes of Examples 1 to 5 and Comparative Example 1 were applied were evaluated. The batteries were charged at 1.0 C to 4.2 C under the conditions of constant current and constant voltage (CC/CV) and then were discharged at 1.0 C to the cut-off voltage of 2.75 V under the condition of CC. The discharge capacity was measured and is shown in FIG. 1. As shown in FIG. 1, the batteries using the electrolytes of Examples 1 to 5 were proven to be excellent compared to the battery using the electrolyte of Comparative Example 1.

The High Rate Discharge Properties of Batteries

The high rate discharge properties of the lithium secondary batteries using the electrolytes of Examples 1 to 5 and Comparative Example 1 were evaluated. The batteries were charged at 0.5 C to 4.2 V under the conditions of constant current and constant voltage (CC/CV) and then were dis charged at 0.2 C to 2.0 C to the cut-off voltage of 2.75 V under the condition of CC. The discharge capacity was measured and is shown in FIGS. 2a to 2f. As shown in FIGS. 2a to 2f, the injection of the gas additive of the present invention does not lower the high rate discharge properties of lithium secondary batteries.

The Low Temperature Discharge Properties of Batteries

Figure 3:
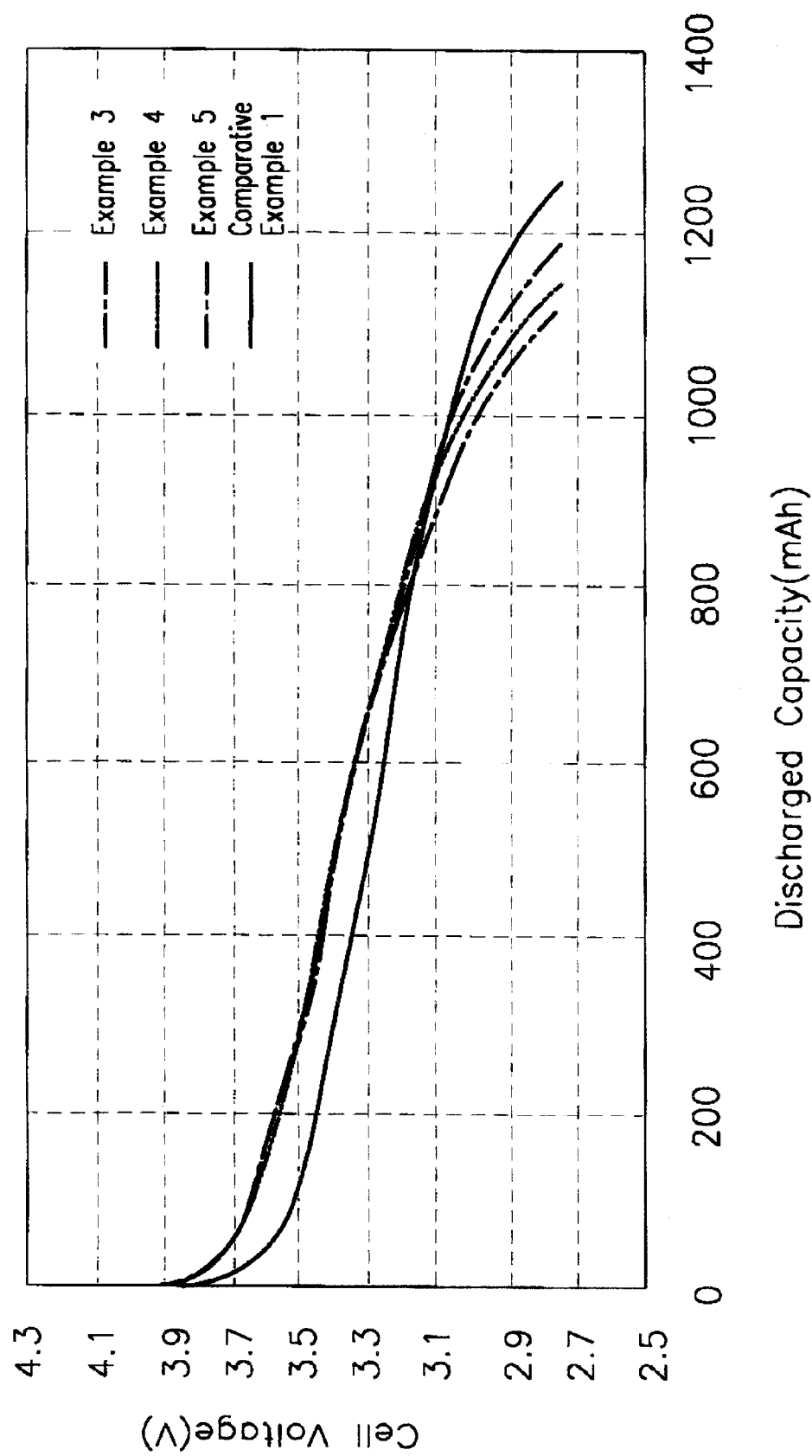
FIG. 3 is a graph showing the low temperature discharge characteristics of lithium secondary batteries in which the electrolytes of Examples 3 to 5 and Comparative Example 1 are injected.

The low temperature discharge properties of the lithium secondary batteries using the electrolytes of Examples 3 to 5 and Comparative Example 1 were evaluated. The batteries were charged at 0.2 C under the condition of constant current and then were discharged to the cut-off voltage of 2.75 V at a temperature of −20° C. The discharge capacity was measured and is shown in FIG. 3. As shown in FIG. 3, the injection of the gas additive of the present invention does not lower the low temperature discharge properties of lithium secondary batteries.

Lithium secondary batteries to which a gas additive having a high reduction potential is added maintain a constant thickness since the increase in internal pressure due to the production of gases does not occur in the batteries. In addition, the cycle life, high rate discharge properties and low temperature discharge properties of the batteries are maintained, and the stability of the batteries is excellent.

Simple modifications of the present invention can be easily made by those skilled in the art, and are considered to be within the scope of the present invention.

What is claimed is:

1. An electrolyte for a lithium secondary battery comprising:
   at least one lithium salt;
   a non-aqueous organic solvent; and
   a gas additive having a higher reduction potential than the non-aqueous organic solvent and being selected from $SO_2$ and $N_2O$, wherein said gas additive is added in an amount of 20% by weight or less based on the weight of the organic solvent.

2. An electrolyte for a lithium secondary battery according to claim 1, wherein said gas additive has a reduction potential ranging from 0.5 to 3.5 V based on the $Li^+$ ions.

3. An electrolyte for a lithium secondary battery according to claim 1, wherein said non-aqueous organic solvent is selected from the group consisting of ethylene carbonate (EC), dimethyl carbonate (DMC), diethyl carbonate (DEC), methylethyl carbonate (MEC), propylene carbonate (PC) and mixtures thereof.

4. An electrolyte for a lithium secondary battery according to claim 1, wherein the lithium salt comprises a supporting electrolytic salt selected from the group consisting of lithium hexafluorophosphate, lithium tetrafluoroborate, lithium perchlorate, lithium trifluoromethanesulfonate, lithium hexafluoroarsenate and mixtures thereof.

5. A lithium secondary battery comprising:
   an electrolyte according to claim 1;
   a positive electrode having a positive active material comprising a lithium-transition metal oxide; and
   a negative electrode having a negative active material comprising at least one of a lithium metal, a lithium alloy, carbon and a carbon complex.

6. A lithium secondary battery according to claim 5, wherein said electrolyte is prepared by adding a gas additive having a reduction potential ranging from 0.5 to 3.5 V based on the $Li^+$ ions.

7. A lithium secondary battery according to claim 5, wherein said electrolyte comprising a non-aqueous organic solvent selected from the group consisting of ethylene carbonate (EC), dimethyl carbonate (DMC), diethyl carbonate (DEC), methylethyl carbonate (MEC), propylene carbonate (PC) and mixtures thereof.

8. A lithium secondary battery according to claim 5, wherein the lithium salt comprises a supporting electrolytic salt selected from the group consisting of lithium hexafluorophosphate, lithium tetrafluoroborate, lithium perchlorate, lithium trifluoromethanesulfonate, lithium hexafluoroarsenate and mixtures thereof.

9. An electrolyte for a lithium secondary battery comprising:
   at least one lithium salt;
   a non-aqueous organic solvent; and
   a gas additive comprising $N_2O$.

10. An electrolyte for a lithium secondary battery according to claim 9, wherein said gas additive is added in an amount of 20% by weight or less based on the weight of the organic solvent.

11. An electrolyte for a lithium secondary battery according to claim 9, wherein said non-aqueous organic solvent is selected from the group consisting of ethylene carbonate (EC), dimethyl carbonate (DMC), diethyl carbonate (DEC), methylethyl carbonate (MEC), propylene carbonate (PC) and mixtures thereof.

12. An electrolyte for a lithium secondary battery according to claim 9, wherein the lithium salt comprises a supporting electrolytic salt selected from the group consisting of lithium hexafluorophosphate, lithium tetrafluoroborate, lithium perchlorate, lithium trifluoromethanesulfonate, lithium hexafluoroarsenate and mixtures thereof.

13. A lithium secondary battery comprising:
   an electrolyte according to claim 9;
   a positive electrode having a positive active material comprising a lithium-transition metal oxide; and
   a negative electrode having a negative active material comprising at least one of a lithium metal, a lithium alloy, carbon and a carbon complex.

* * * * *